US011490237B2

(12) United States Patent
Wei et al.

(10) Patent No.: US 11,490,237 B2
(45) Date of Patent: Nov. 1, 2022

(54) BLUETOOTH CONNECTION METHOD AND DEVICE

(71) Applicant: RDA Microelectronics Technologies (Shanghai) Co., Ltd., Shanghai (CN)

(72) Inventors: Peng Wei, Shanghai (CN); Xingpeng Zhao, Shanghai (CN); Wenhua Fan, Shanghai (CN); Yinzheng Zhou, Shanghai (CN); Xiangyu Wang, Shanghai (CN); Mingfang Pan, Shanghai (CN); Wei Liu, Shanghai (CN); Qinghua Yu, Shanghai (CN)

(73) Assignee: RDA MICROELECTRONICS TECHNOLOGIES (SHANGHAI) CO., LTD., Shanghai (CN)

( * ) Notice: Subject to any disclaimer, the term of this patent is extended or adjusted under 35 U.S.C. 154(b) by 861 days.

(21) Appl. No.: 16/320,909

(22) PCT Filed: Jan. 21, 2019

(86) PCT No.: PCT/CN2019/072574
§ 371 (c)(1),
(2) Date: Jan. 25, 2019

(87) PCT Pub. No.: WO2020/107691
PCT Pub. Date: Jun. 4, 2020

(65) Prior Publication Data
US 2021/0377713 A1 Dec. 2, 2021

(30) Foreign Application Priority Data
Nov. 30, 2018 (CN) .......................... 201811459182.3

(51) Int. Cl.
*H04W 4/80* (2018.01)
*H04W 76/15* (2018.01)

(52) U.S. Cl.
CPC ............. *H04W 4/80* (2018.02); *H04W 76/15* (2018.02)

(58) Field of Classification Search
CPC ................................ H04W 4/80; H04W 76/15
(Continued)

(56) References Cited

U.S. PATENT DOCUMENTS

| 7,272,410 | B2 * | 9/2007 | Ito | ......................... H04W 12/50 |
| | | | | 455/575.1 |
| 10,244,307 | B1 * | 3/2019 | Tong | ......................... H04L 1/16 |

(Continued)

FOREIGN PATENT DOCUMENTS

| CN | 105072537 A | 11/2015 |
| CN | 105161124 A | 12/2015 |

(Continued)

*Primary Examiner* — David Bilodeau
(74) *Attorney, Agent, or Firm* — Blank Rome LLP (57) ABSTRACT

A method and an apparatus for Bluetooth connection are disclosed. A first Bluetooth connection can be established between a first node of multiple data receiving nodes and a data source, the multiple data receiving nodes can share a data packet transmitted by the data source via the first Bluetooth connection, and a second node can be selected according to a preset rule from among the multiple data receiving nodes to feed back a response signal to the data source. In a method and an apparatus, the multiple data receiving nodes can be regarded as a whole, which share a data packet transmitted from the data source and jointly maintain the first Bluetooth connection, and only one of the multiple data receiving nodes is selected to feed back a response signal. Conforming to Bluetooth communication protocols, a method and an apparatus can meet the demanding requirements on hardware resources of a Bluetooth connection among a data source and multiple data receiving nodes. A one-to-many Bluetooth connection can be realized (Continued)

which saves power consumption without additionally upgrading the data source.

7 Claims, 3 Drawing Sheets

(58) Field of Classification Search
USPC ........................................................ 455/41.2
See application file for complete search history.

(56) References Cited

U.S. PATENT DOCUMENTS

| | | | | |
|---|---|---|---|---|
| 10,412,481 | B1* | 9/2019 | Wu | H04R 5/033 |
| 10,448,232 | B2* | 10/2019 | Sung | H04L 1/16 |
| 10,715,985 | B2* | 7/2020 | Huang | H04L 1/22 |
| 10,784,993 | B1* | 9/2020 | Batra | H04L 1/1887 |
| 11,012,842 | B2* | 5/2021 | Sung | G06F 3/162 |
| 2012/0058727 | A1* | 3/2012 | Cook | H04R 5/02 455/41.3 |
| 2016/0112825 | A1* | 4/2016 | Miller | H04W 4/80 455/41.2 |
| 2017/0237845 | A1* | 8/2017 | Yoo | H04W 88/02 455/557 |
| 2017/0272851 | A1* | 9/2017 | Kim | H04W 4/06 |
| 2017/0366924 | A1* | 12/2017 | Thoen | H04M 1/6066 |
| 2018/0035207 | A1* | 2/2018 | Hsu | H04R 3/12 |
| 2018/0084456 | A1* | 3/2018 | Gostev | H04W 84/18 |
| 2018/0084606 | A1* | 3/2018 | Li | H04W 72/085 |
| 2019/0191246 | A1* | 6/2019 | Born | H04R 5/033 |

FOREIGN PATENT DOCUMENTS

| | | |
|---|---|---|
| CN | 108323246 | 7/2018 |
| CN | 108337074 A | 7/2018 |
| CN | 108419228 A | 8/2018 |
| CN | 108429949 | 8/2018 |
| CN | 108429949 A | 8/2018 |
| CN | 108901004 | 11/2018 |

\* cited by examiner

BLUETOOTH CONNECTION METHOD AND DEVICE

RELATED APPLICATIONS

This application is a U.S. National Stage Application of International Application No. PCT/CN2019/072574, filed on Jan. 21, 2019, which claims priority of Chinese Application No. 201811459182.3, filed on Nov. 30, 2018. The entire contents of those applications are incorporated herein by reference.

TECHNICAL FIELD

The present disclosure relates to the technical field of communication, and, in particular, to a method and an apparatus for Bluetooth connection.

BACKGROUND

In the related art, according to Bluetooth protocols, the classic Bluetooth data transmission can be performed by broadcasting or establishing a connection. For reliability, energy consumption, security and other considerations, many current practical applications of Bluetooth, including Bluetooth music transmission, Bluetooth voice transmission, Bluetooth file transmission, etc., are mainly carried out by establishing a Bluetooth connection. Such Bluetooth connection is one-to-one data transmission between a data source and a data receiving node. However, one demand in reality is that there are often two or more data receiving nodes that need to wirelessly receive data from the same data source, such as split multi-channel Bluetooth speakers, split stereo Bluetooth headsets, and the synchronized control of multiple smart devices. In some applications, each of the data receiving nodes requires reliable data reception with no loss. There are also requirements on the synchronization among the data reception by different data nodes, that is, the time difference cannot be too large. As a Bluetooth device is often powered by batteries, the data receiving nodes also have certain requirements on power consumption.

There is up to now no effective solution to the problem of high requirements on hardware resources necessary for Bluetooth connection between a data source and multiple data receiving nodes in the related art.

SUMMARY

According to the present disclosure, there are provided a method and an apparatus for Bluetooth connection that are capable of solving the problem of high requirements on hardware resources necessary for Bluetooth connection between a data source and multiple data receiving nodes in the related art.

According to one aspect of the present disclosure, there is provided a Bluetooth connection method comprising: a first node of multiple data receiving nodes establishing a first Bluetooth connection with a data source; sharing a data packet transmitted by the data source among the multiple data receiving nodes via the first Bluetooth connection, and selecting according to a preset rule a second node from among the multiple data receiving nodes by which to feed back a response signal to the data source.

Optionally, the method comprises: before or after establishing a first Bluetooth connection between a first node of multiple data receiving nodes and a data source, establishing a wireless connection between every two of the multiple data receiving nodes to form a relational network of nodes, the topology of which includes star, line, or mesh.

Optionally, the method comprises: after establishing a first Bluetooth connection between a first node of multiple data receiving nodes and a data source, sending, by the first node, a parameter of the first Bluetooth connection to the network of nodes, wherein the parameter includes at least one of the address of the data source, the Bluetooth clock of the data source, an available-channel list, and a communication key.

Optionally, the method comprises: after sending, by the first node, a parameter of the first Bluetooth connection to the network of nodes, tracking, by the multiple data receiving nodes other than the first node, the information sent by the first Bluetooth connection based on the parameter, wherein the information includes at least one of audio encoding information, audio control information, video encoding information, and information of a change in available channels.

Optionally, sharing a data packet transmitted by the data source among the multiple data receiving nodes via the first Bluetooth connection includes: taking over in turn, by the multiple data receiving nodes, the first Bluetooth connection based on the Bluetooth clock of the data source and in accordance with a preset switching time.

Optionally, the method comprises: before selecting according to a preset rule a second node from among the multiple data receiving nodes by which to feed back a response signal to the data source, sending, by the multiple data receiving nodes, information for arbitration (arbitration basis information) to the network of nodes, wherein the information for arbitration includes at least one of battery levels of the data receiving nodes, serial numbers of the data receiving nodes, whether or not the data packet is received correctly, and the received signal strength indicator of the data packet, wherein each of the data receiving nodes stores the information for arbitration of all the data receiving nodes.

Optionally, selecting according to a preset rule a second node includes at least one of: selecting, as the second node, one of the data receiving nodes that is the highest in terms of the remaining battery capacity; selecting, as the second node, one of the data receiving nodes that is the highest in terms of signal strength of the Bluetooth connections between the data receiving nodes and the data source; selecting the second node from among the data receiving node according to a Bluetooth clock time at the beginning of the current data packet; selecting randomly the second node from among the data receiving nodes; and selecting the second node from among the data receiving nodes according to whether or not they receive the data packet correctly.

Optionally, to feed back a response signal to the data source includes: to acquire information indicative of whether or not the other data receiving nodes receive the data packet correctly; and to determine whether the response signal is ACK or NACK, according to whether or not the second node receives the data packet correctly and whether or not the other data receiving nodes receive the data packet correctly.

According to another aspect of the present disclosure, there is provided a Bluetooth connection apparatus comprising: a connection module to enable the establishment of a first Bluetooth connection between a first node of multiple data receiving nodes and a data source; and a sharing module to enable the sharing of a data packet transmitted by the data source among the multiple data receiving nodes via the first Bluetooth connection and to enable the selection according to a preset rule a second node from among the multiple data receiving nodes by which to feed back a response signal to the data source.

According to a method and an apparatus for Bluetooth connection provided by embodiments of the present disclosure, a first Bluetooth connection can be established between a first node of multiple data receiving nodes and a data source, the multiple data receiving nodes can share a data packet transmitted by the data source via the first Bluetooth connection, and a second node can be selected according to a preset rule from among the multiple data receiving nodes to feed back a response signal to the data source. In a method and an apparatus, the multiple data receiving nodes can be regarded as a whole, which share a data packet transmitted from the data source and jointly maintain the first Bluetooth connection, and only one of the multiple data receiving nodes is selected to feed back a response signal. Conforming to Bluetooth communication protocols, a method and an apparatus can meet the demanding requirements on hardware resources of a Bluetooth connection among a data source and multiple data receiving nodes. A one-to-many Bluetooth connection can be realized which saves power consumption without additionally upgrading the data source.

DETAILED DESCRIPTION

In order to make the purpose, technical solution and advantages of the embodiments of the present disclosure more apparent, the technical solution in the embodiments of the present disclosure will be clearly and completely described hereinafter in conjunction with the accompanying drawings thereof. Apparently, the embodiments described below are merely some but not all of the embodiments of the present disclosure. All other embodiments obtained by those of ordinary skill in the art on the basis of the embodiments described below without inventive labor fall within the scope of protection covered by the present disclosure.

Figure 1:
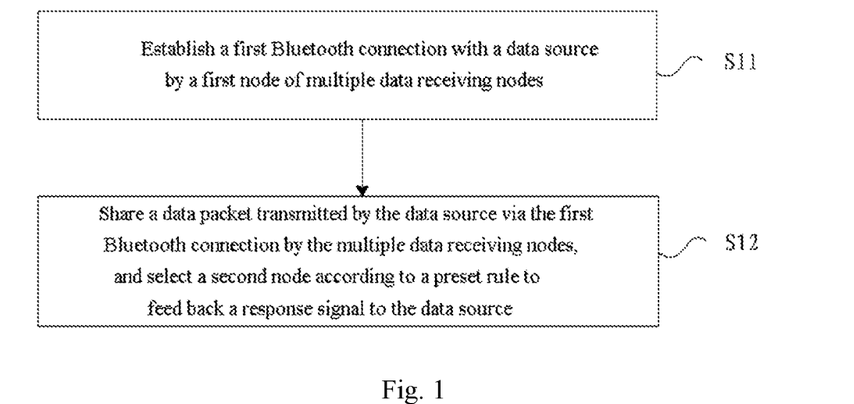
FIG. 1 is a flowchart illustrating a method for Bluetooth connection according to the present disclosure.

According to an embodiment of the present disclosure, there is provided a method for Bluetooth connection. FIG. 1 is a flowchart illustrating a method for Bluetooth connection according to the present disclosure. As shown in FIG. 1, the method comprises steps S11 and S12.

In step S11, a first Bluetooth connection is established with a data source by a first node of multiple data receiving nodes.

In step S12, a data packet transmitted by the data source is shared via the first Bluetooth connection by the multiple data receiving nodes, and a second node is selected according to a preset rule to feedback a response signal to the data source.

According to a method and an apparatus for Bluetooth connection provided by embodiments of the present disclosure, a first Bluetooth connection is established with a data source by a first node of multiple data receiving nodes, a data packet transmitted by the data source is shared via the first Bluetooth connection by the multiple data receiving nodes, and a second node is selected according to a preset rule to feedback a response signal to the data source. With the above scheme, the multiple data receiving nodes are regarded as a whole, which share a data packet transmitted by the data source, jointly maintain the first Bluetooth connection, and select only one node to feed back a response signal. This conforms to Bluetooth protocols in the related art, addresses the problem of the high requirement on hardware resources necessary for a Bluetooth connection between a data source and multiple data receiving nodes, and could realize a one-to-many Bluetooth connection without additionally upgrading the data source, which saves power consumption.

Optionally, the method comprises: before or after establishing, by the first node of the multiple data receiving nodes, the first Bluetooth connection with the data source, causing a wireless connection to be established between every two of the multiple data receiving nodes to form a relational network, the topological structure of which includes star structure, line structure, or mesh structure.

Optionally, the method comprises: after establishing, by the first node of the multiple data receiving nodes, the first Bluetooth connection with the data source, sending, by the first node, parameters of the first Bluetooth connection to the relational network, the parameters including at least one of: an address of the data source, a Bluetooth clock of the data source, an available-channel list, and a communication key.

Optionally, the method comprises: after sending, by the first node, a parameter of the first Bluetooth connection to the relational network of nodes, causing the multiple data receiving nodes other than the first node to track information sent by the first Bluetooth connection based on the parameters, the information including at least one of: audio encoding information, audio control information, video encoding information, and information of a change in channel list.

Optionally, sharing by the multiple data receiving nodes the data packet transmitted by the data source via the first Bluetooth connection includes: causing the multiple data receiving nodes to take over in turn the first Bluetooth connection in accordance with a preset switching time based on the Bluetooth clock of the data source.

Optionally, the method comprises: before selecting the second node according to the preset rule to feed back the response signal to the data source, causing the multiple data receiving nodes to send arbitration basis information to the relational network, the arbitration basis information including at least one of battery levels of the data receiving nodes themselves, serial numbers of the data receiving nodes, whether or not the data packet is received correctly, and received signal energy of the data packet, wherein each of the data receiving nodes saves the arbitration basis information of all the data receiving nodes.

Optionally, selecting the second node according to the preset rule includes at least one of the followings: causing the data receiving node with the highest remaining battery level to be selected as the second node; causing the data receiving node with the highest signal energy in the Bluetooth connection with the data source to be selected as the second node; causing the second node to be selected from the multiple data receiving nodes according to a Bluetooth clock time at the beginning of the current data packet; causing the second node to be randomly selected from the multiple data receiving nodes; and causing the second node to be selected according to whether or not the data packet is correctly received by each of the data receiving nodes.

Optionally, to feed back a response signal to the data source includes: acquiring whether or not the data packet is correctly received by other data receiving nodes than the second node; and determining the response signal to be ACK or NACK according to whether or not the data packet is correctly received by the second node and whether or not the data packet is correctly received by the other data receiving nodes than the second node.

According another embodiment of the present disclosure, there is provided a Bluetooth connection apparatus comprising: a connection module to establish a first Bluetooth connection between a first node of multiple data receiving nodes and a data source; and a sharing module to share a data packet transmitted by the data source among the multiple data receiving nodes via the first Bluetooth connection, and to select, according to a preset rule, a second node from among the multiple data receiving nodes by which to feed back a response signal to the data source.

Hereinafter, another embodiment of the present disclosure will be described.

Bluetooth protocols do not specifically prescribe a way to transmit data in such a one-to-many scenario as above. At present, such one-to-many Bluetooth data transmission can be implemented mainly by the following three options in the related art.

First Option:

A data source sequentially establishes a Bluetooth connection with each of the data receiving nodes, and sends data to each of the data receiving nodes via the respective Bluetooth connections. Data synchronization between the data receiving nodes may be performed via the Bluetooth connections or by other means.

Second Option:

A data source selects one or some of the data receiving nodes to establish a Bluetooth connection. A wireless connection is established between the selected node/nodes and the remaining nodes by Bluetooth or other means. After the data source transmits data to the selected node/nodes via the Bluetooth connection, the selected node/nodes forwards/forward the data to the receiving nodes that do not have a direct Bluetooth connection with the data source, via the Bluetooth connection or by other wireless means. Data synchronization between the data receiving nodes may be performed via the Bluetooth connection or by other means.

Third Option:

Such option is a one-to-two audio data transmission method. A Bluetooth connection is established between two audio receiving nodes, one of which is the primary node and the other is the secondary node. An audio source establishes a Bluetooth connection with the primary node. At the time of the upcoming audio transmission, the primary node notifies the secondary node of specific information of an audio link via the Bluetooth connection between the primary and secondary nodes, and the secondary node monitors the data of the audio source according to this information but does not respond thereto. During the transmission, the primary node interacts with the audio source, and the secondary node interacts only with the primary node. When the secondary node loses some data while monitoring, it chooses to abandon the data or reacquire the data from the primary node.

Each of the above three options has its own shortcomings.

The first option has higher requirements on the data source, i.e., the data source is required to be capable of maintaining several connections at the same time and transmitting data respectively. This requirement is difficult to implement in some applications. For example, many mobile phones do not support the simultaneous connection with two Bluetooth speakers to play music. Moreover, this option requires the data source to repeatedly send each piece of data multiple times, which results in a waste of power consumption of the data source.

The second option has higher requirements on the data receiving node that undertakes the forwarding task, i.e., such data receiving node is required to, on one hand, receive data sent by the data source via the Bluetooth connection, and on the other hand, forward the data to other receiving nodes, thereby consuming more power than the other nodes do. Meanwhile, the forwarding node is prone to a scheduling problem on receiving and forwarding, especially when the amount of data is relatively large and retransmission occurs, which would slow down the transmission speed of the data source. In some applications, the performance of transmission between the data receiving nodes is weaker than that between the data source and the data receiving node, resulting in higher rates of retransmission between the data receiving nodes. That increases the power consumption and may cause a delay in the data transmission. In addition, in the forwarding mechanism, the timing at which each of the nodes receives the data packet are quite different, and in some applications, a special synchronization process is required.

In the third option, the primary node interacts with the data source, whereas the secondary node only passively monitors the data source, silent to the data source. Thus, the secondary nodes lack quick remedial measures in case of packet loss when monitoring. It can only abandon the data or request forwarding from the primary node, which may result in data loss and out of synchronization. Besides, some control information of the secondary node cannot be directly transmitted to the data source and needs to be forwarded by the primary node. The primary node undertakes all the tasks of interaction with the data source, thereby consuming more power than the secondary node does and being prone to early power exhaustion.

In view of the above disadvantages, the present disclosure aims to implement a one-to-many Bluetooth data transmission with low, balanced power consumption and high synchronization by improving how data receiving nodes interact with each other and how data receiving nodes transmit a Bluetooth response signal to the data source, without imposing special requirements on the data source.

The present disclosure mainly addresses the problem of data transmission via Bluetooth in a one-to-many scenario. The traditional Bluetooth data transmission is mainly performed one-to-one. In an application scenario where one-to-many data distribution is required, the traditional Bluetooth transmission method is usually to establish multiple links for transmission, or to sequentially forward data among multiple nodes, and thus has the disadvantages of high power consumption and considerable data delay, to name a few. The present disclosure integrates multiple data receiving nodes into one and, by doing so, simplifies the one-to-many problem into a one-to-one problem, simplifies the requirements on the data source, reduces the overall power consumption, improves the data synchronization, and balances the power consumptions of the multiple data receiving nodes.

One of the key points of the present disclosure is that a data source still establishes a Bluetooth connection in accordance with the traditional one-to-one transmission manner, but each of the data receiving nodes can directly receive data and directly reply a response signal through information sharing and arbitration among these nodes, thereby achieving a one-to-many Bluetooth transmission with low, balanced power consumption and low delay.

Specifically, when two or more data receiving nodes need to receive data sent by the same data source via Bluetooth, the data source only needs to establish a Bluetooth connection with any one of the data receiving nodes, and then information can be shared and arbitrated by wireless information transfer among the data receiving nodes, thus as a whole taking over the Bluetooth connection. This way, each of the data receiving nodes can directly receive data sent by the data source and directly sends, to the data source according to a certain rule, a response signal required to maintain the Bluetooth connection.

Figure 2:
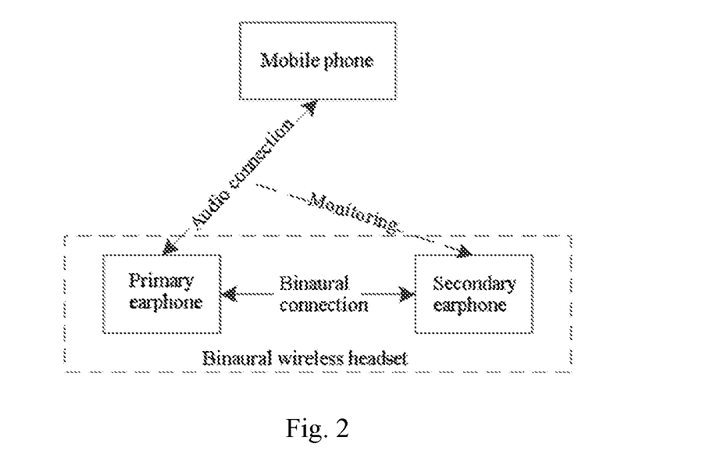
FIG. 2 is a schematic diagram of establishing a Bluetooth connection according to a Third Option in the related art.

FIG. 2 is a schematic diagram of establishing a Bluetooth connection according to the third option in the related art. As shown in FIG. 2, a Bluetooth binaural wireless headset is taken as an example. The mobile phone, acting as an audio data source, establishes a Bluetooth audio connection with the primary earphone as a data receiving node, which is referred to as an audio connection. A Bluetooth connection is also established between the primary earphone and the secondary earphone, which is referred to as a binaural connection. The primary earphone transfers parameters of the audio connection to the secondary earphone via the binaural connection. The secondary earphone monitors the audio connection according to these parameters and obtains an audio packet sent by the mobile phone, but it does not send any information to the mobile phone. The primary earphone and the secondary earphone can send information to each other via the binaural connection. For example, the secondary earphone can inform the primary earphone of the numbers of audio data that is missed during the monitoring, and the primary earphone then forwards these audio data to the secondary earphone. As another example, the secondary earphone can inform the primary earphone of the interference in the Bluetooth airborne channel, which is then forwarded by the primary earphone to the mobile phone.

Figure 3:
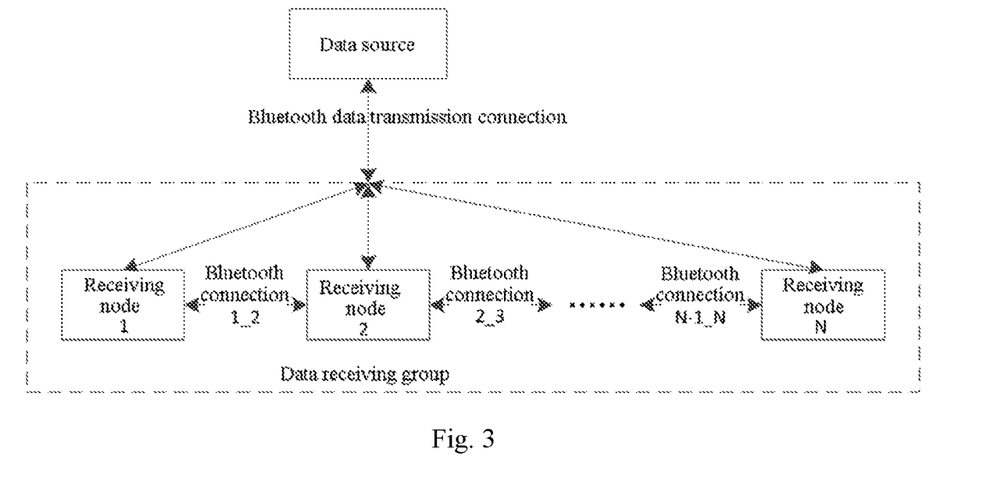
FIG. 3 is a schematic diagram of establishing a Bluetooth connection according to another embodiment of the present disclosure.

FIG. 3 is a schematic diagram of establishing a Bluetooth connection according to another embodiment of the present disclosure. As shown in FIG. 3, the Bluetooth data transmission system of the present disclosure comprises a data source and a data receiving group consisting of several data receiving nodes (referred to as N data receiving nodes for the convenience of description). The Bluetooth data source may be a desktop computer, a mobile phone, a tablet, or the like. The Bluetooth data receiving node may be a mobile phone, a speaker, a headset, a smart home appliance, or the like. The data that needs to be transmitted via Bluetooth may be music, voice call, text, image, and so on.

According to the classic Bluetooth protocols, before the start of Bluetooth data transmission, the data source usually first searches for Bluetooth devices, and selects the device to be connected from the searched Bluetooth devices for connection and pairing. In the present disclosure, the data source may select any one of the data receiving nodes to establish a Bluetooth connection, and needs to maintain only this one Bluetooth connection during the data transmission. The connection is called a Bluetooth data transmission connection. For the convenience of description, suppose hereinafter that the data source selects receiving node 1 to establish a Bluetooth data transmission connection.

A wireless network (referred to as a relational network) needs to be established among N Bluetooth data receiving nodes via a Bluetooth connection or by other types of wireless connections. There are no specific requirements on the topology of the relational network, which could be a star, line, mesh structure or the like. Taking a line structure as an example, receiving node 1 establishes a Bluetooth connection with receiving node 2, receiving node 2 establishes a Bluetooth connection with receiving node 3 . . . and receiving node N−1 establishes a Bluetooth connection with receiving node N. These connections are called Bluetooth connection 1_2, Bluetooth connection 2_3, . . . , and Bluetooth connection N−1_N. Irrespective of the type of the topology of the relational network, each of the receiving nodes needs to communicate with other nodes via these Bluetooth connections and get to know the total number N of the data receiving nodes as well as the serial number (which is one of 1 to N) of the receiving node itself. The act of establishing a relational network of receiving nodes may be prior or subsequent to the establishment of the Bluetooth data transmission connection, with no specific requirements.

After the establishment of the Bluetooth data transmission connection and the formation of the relational network of receiving nodes, the receiving node connected to the data source (assumed to be receiving node 1) releases some parameters of the Bluetooth data transmission connection via the relational network of receiving nodes. These parameters include the Bluetooth address of the data source, the Bluetooth clock, an available-channel list, a communication key, and so on. Based on these parameters, the remaining receiving nodes (receiving node 2 to receiving node N) can track all the information sent and received via the Bluetooth data transmission connection. The information includes data-related parameters and parameters required to maintain the Bluetooth connection, such as audio encoding information, information of a change in the channel list, and the like. After having successfully tracked the Bluetooth data transmission connection, all the receiving nodes jointly agree on a subsequent switching time and an arbitration method, and jointly maintain the Bluetooth data transmission connection in accordance with the arbitration method from the switching time.

Figure 4:
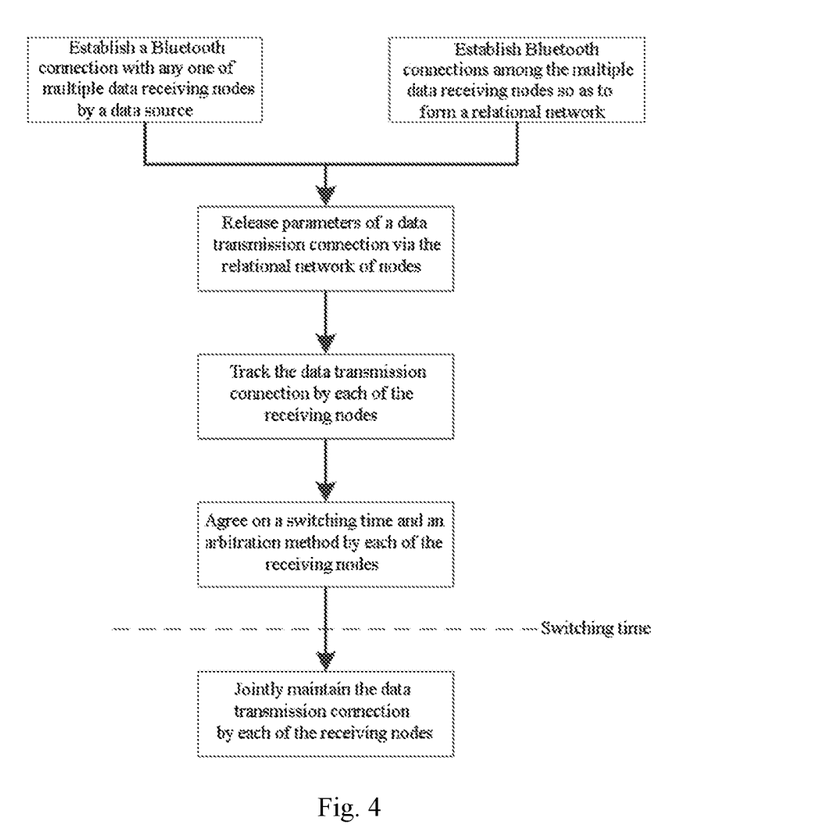
FIG. 4 is a flowchart of jointly maintaining a Bluetooth connection by multiple data receiving nodes according to another embodiment of the present disclosure.

FIG. 4 is a flowchart of jointly maintaining a Bluetooth connection by multiple data receiving nodes according to another embodiment of the present disclosure.

As shown in FIG. 4, the method comprises the following steps.

In step I, a Bluetooth connection is established with any one of the multiple data receiving nodes by a data source, and Bluetooth connections are established among the multiple data receiving nodes so as to form a relational network.

In step II, parameters of a data transmission connection are released via the relational network of nodes.

In step III, each of the receiving nodes tracks the data transmission connection.

In step IV, each of the receiving nodes agrees on a switching time and an arbitration method.

In step V, each of the receiving nodes jointly maintains the data transmission connection at the switching time.

The switching time agreed on by the data receiving nodes can be based on Bluetooth clock of the data source. After the previous transmission of the parameters of the data transmission connection, all the data receiving nodes have acquired the Bluetooth clock of the data source and can continue to track. Once the data receiving nodes agree on a unified Bluetooth clock value, when the Bluetooth clock of the data source reaches the value, the receiving nodes can switch synchronously.

After the switching time comes, the data receiving nodes start to jointly maintain the Bluetooth data transmission connection according to a specific arbitration mechanism. Bluetooth protocols define that, after the data source sends a Bluetooth data packet (DATA), it usually wishes to obtain a Bluetooth response packet to the data packet (with ACK indicating a successful reception, and NACK indicating an unsuccessful reception), unless the Bluetooth data packet is a synchronous voice packet (SCO) or the like. In the existing solutions, the response to a data packet is invariably sent by a data node that is directly connected to the data source. According to a solution described in the present disclosure, after the switching time comes, the response packet may be sent by any one of the data receiving nodes. It is the arbitration mechanism that decides which one of the receiving nodes sends the response packet and which kind of response packet is sent. The data source neither knows nor cares about which one of the receiving nodes sends the response packet. After the switching time comes, the Bluetooth connection established with receiving node 1 by the data source can be regarded substantially as a Bluetooth connection between the data source and the whole data receiving group.

According to the present disclosure, the arbitration mechanism includes two steps of information collection and arbitration selection.

Information collection means that the receiving nodes exchange and acquire information necessary for arbitration via the relational network of receiving nodes, such as battery levels, serial numbers of the data receiving nodes, whether or not the data packet is received correctly, etc., and store the information in the respective storage space (RAM) of the data receiving nodes. Part of the information has been saved when the relational network of receiving nodes is established, such as serial numbers of the data receiving nodes. Another part of the information needs to be regularly refreshed, such as battery levels. Still another part of the information requires real-time interaction, such as whether or not the data packet is received correctly. Different arbitration selection schemes require different information, so an information collection scheme and an arbitration selection scheme correspond to each other.

Of the information that needs to be collected, whether the data packet is received correctly is closely related to how reliable the Bluetooth data transmission is. In a Bluetooth data transmission system, different types of data have different requirements on reliability. For example, music and file data needs to be reliably received, while such data as voice calls and real-time video allows partial loss to ensure real-time. According the Bluetooth protocols, for each data packet for a reliable connection, the data source can continue to send the following data only after receiving the ACK. If the NACK is received or no response packet is received, the data source needs to resend the data packet. For each data packet for an unreliable connection, the data source may not check the response packet, or the data source may check the response packet but only performs resending for a limited number of times. In sending a response packet, each of the nodes should refer to whether the data packet has been correctly received by the remaining nodes and whether the data packet has been correctly received by the node itself, and then select the appropriate ACK or NACK for transmission. Each of the nodes may quickly transmit a token packet (TOKEN) indicating whether it has received the data packet correctly in a short time period after a data packet is received and before a response packet is sent, so as to let all the other nodes know the situation. The following exemplary description is made in conjunction with an arbitration selection scheme.

Arbitration selection refers to a process during which each node, after obtaining the necessary information, autonomously determines whether or not the node needs to send a response packet and which response packet will be sent. The arbitration selection is done independently by each node and does not require the nodes to communicate with each other. The nodes do not need to mutually inform the result of arbitration selection. Several possible arbitration selection schemes are listed below for selecting the data receiving nodes that sends a response packet.

First Arbitration Scheme

The node with the highest remaining battery level is selected according to the battery levels of the nodes.

Second Arbitration Scheme

The node with the highest received signal energy is selected according to the signal energy (RSSI) of the packet received by each node. The selected node may be the node closest to the data source or the node with fewest barriers in the space.

Third Arbitration Scheme

Figure 5:
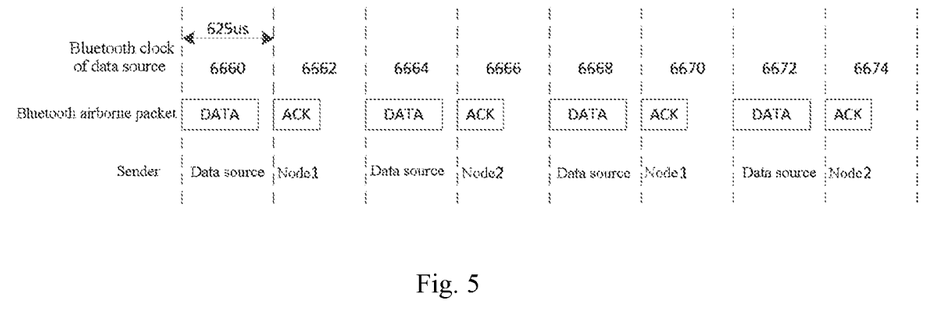
FIG. 5 is a schematic diagram of the arbitration scheme III according to another embodiment of the present disclosure.

The nodes are selected in turn in accordance with the serial numbers of each of the nodes, the total number N of the receiving nodes, and Bluetooth clock of the data source. A Bluetooth clock of a data source is a 28-bit number that cycle-accumulates over time, accumulating once every 312.5 microseconds. With this value, it is possible to sequentially select each receiving node as time passes, for example, response packets are sent in the order of 1, 2, . . . , N, 1, 2, . . . , N. FIG. 5 is a schematic diagram of the third arbitration scheme according to another embodiment of the present disclosure. As shown in FIG. 5, which is an example of the third arbitration selection scheme, the data source transmits a single-slot (each Bluetooth slot occupying 625 microseconds) data packet, the data receiving group includes two nodes, and the response packet are sent in sequence in accordance with the Bluetooth clock of the data source. When the Bluetooth clock at the beginning of the data packet is divisible by 8, node 2 sends a response packet. Otherwise, node 1 sends a response packet.

Fourth Arbitration Scheme

The nodes are selected out-of-order based on the serial numbers of the nodes, the total number N of the receiving nodes and the Bluetooth clock of the data source. The Bluetooth clock of the data source at the beginning of the data packet is input to a random number generator with the same rule for each node, and a node is selected according to the generated random number. Although the order of the nodes that send response packets is scrambled, the respective numbers of times that the nodes send response packets over a longer period of time are expected to be equalized.

Fifth Arbitration Scheme

A node is selected depending on whether it receives a data packet correctly. After learning about whether the other nodes receive a data packet, a node decides to send or not to send a response packet by considering whether it receives the data packet. This arbitration selection scheme will be described with a data receiving group including two nodes as an example. In this example, suppose that the data source has previously established a data transmission connection with node 1, and node 1 and node 2 jointly maintain the connection after the switching time. In this example, each data packet needs to be reliably received by all the nodes, and the data source will not send the next data packet unless it receives ACK.

Every time after the data source sends a data packet, node 1 follows the following rules: if node 1 receives the data packet successfully neither this time nor before, it replies with NACK; if node 1 receives the data packet successfully this time or before, it sends a TOKEN without sending a response packet.

Every time after the data source sends a data packet, node 2 follows the following rules: if node 2 receives TOKEN, sent by node 1 for the data packet, neither this time nor before, it does not send a response packet; if node 2 has received a TOKEN this time or before but has successfully received the data packet neither this time nor before, it replies with NACK; if node 2 has received a TOKEN this time or before and has successfully received the data packet this time or before, it replies with ACK.

Figure 6:
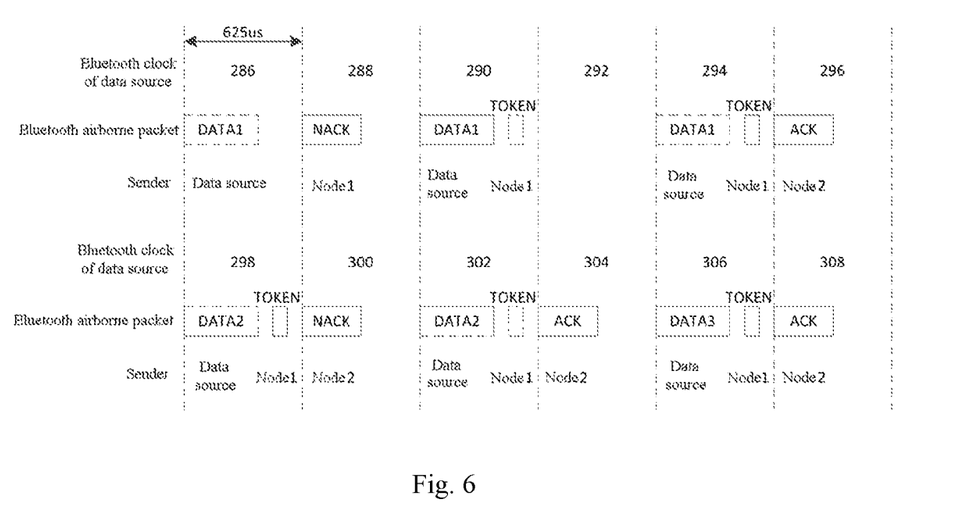
FIG. 6 is a schematic diagram of the arbitration scheme V according to another embodiment of the present disclosure.

FIG. 6 is a schematic diagram of the fifth arbitration scheme according to another embodiment of the present disclosure. As shown in FIG. 6, in Bluetooth clock slot 286, neither of the nodes receives DATA1 successfully; in Bluetooth clock slot 290, both of the nodes successfully receive DATA1, but node 2 does not receive TOKEN; in Bluetooth clock slot 294, both of the nodes abandoned a repeated reception of DATA1, and node 2 receives the TOKEN; in Bluetooth clock slot 298, node 2 does not receive DATA2 successfully, node 1 receives DATA2 successfully, and node 2 receives the TOKEN; in Bluetooth clock slot 302, node 2 receives DATA2 successfully, node 1 abandons a repeated reception of DATA2, and node 2 does not receive the TOKEN; in Bluetooth clock slot 306, both of the nodes receive DATA3 successfully, and node 2 also receives the TOKEN successfully. By following the rules described above, node 1 and node 2 choose to send NACK/ACK or not to send a response packet based on whether they receive TOKEN and the data packet this time and before.

In the course of jointly maintaining the Bluetooth data transmission connection, all the nodes receive data sent by the data source, so naturally, the nodes synchronically receive the data. Moreover, while sending a response packet according to an arbitration scheme, the data receiving nodes may carry Bluetooth information (e.g., Bluetooth channel annotation, music play control, and in-call volume control) depending on actual circumstances so as to directly feedback the information to the data source.

Compared with the first and second options described above, the present disclosure has no special requirements on the Bluetooth data source, but by improving the Bluetooth data receiving nodes, it increases the efficiency of the Bluetooth data transmission of a one-to-two or even one-to-many system, improves the data synchronization among the receiving nodes, and reduces the expected power consumption of the entire system. Compared with the third option described above, the present disclosure improves the reliability of reception by each of the nodes, provides the possibility that all nodes can transmit feedback signals directly to the data source, makes the power consumption of each of the nodes throughout the transmission relatively balanced, and thus may extend the operating time of the whole system.

According to an embodiment of the present disclosure, there is also provided a method for Bluetooth connection, comprising: causing a first node of multiple data receiving nodes to establish a first Bluetooth connection with a data source; and causing the multiple data receiving nodes to share a data packet transmitted by the data source via the first Bluetooth connection, and causing a second node to be selected according to a preset rule to feed back a response signal to the data source.

According to a method and/or an apparatus for Bluetooth connection provided by an embodiment of the present disclosure, a first Bluetooth connection can be established between a first node of multiple data receiving nodes and a data source, the multiple data receiving nodes can share a data packet transmitted by the data source via the first Bluetooth connection, and a second node can be selected according to a preset rule from among the multiple data receiving nodes to feed back a response signal to the data source. In a method and an apparatus, the multiple data receiving nodes can be regarded as a whole, which share a data packet transmitted from the data source and jointly maintain the first Bluetooth connection, and only one of the multiple data receiving nodes is selected to feed back a response signal. Conforming to Bluetooth communication protocols, a method and an apparatus can meet the demanding requirements on hardware resources of a Bluetooth connection among a data source and multiple data receiving nodes. A one-to-many Bluetooth connection can be realized which saves power consumption without additionally upgrading the data source.

The apparatus of this embodiment can be used to implement the technical solution of the method embodiment described above; the principles in their implementation and technical effects are similar, and details thereof are not described herein for brevity.

One of ordinary skill in the art can understand that all or part of the flow of the method of the embodiment described above can be completed by related hardware instructed by a computer program, and the program can be stored in a computer readable storage medium. When executed, the program may include the flow of the embodiment of the method described above. The storage medium may be a magnetic disk, an optical disk, a read-only memory (ROM), a random access memory (RAM), or the like.

The foregoing are merely exemplary embodiments of the present disclosure, but the scope of protection of the present disclosure is not limited thereto. Any change or replacement that can be easily though of by those skilled in the art without departing from the technical scope of the present disclosure should be deemed to be covered by the scope of protection of the present disclosure. Therefore, the scope of protection of the present disclosure should be determined by the claims.

What is claimed is:

1. A method for Bluetooth connection, comprising:
causing a first node of multiple data receiving nodes to establish a first Bluetooth connection with a data source;
causing the multiple data receiving nodes to share a data packet transmitted by the data source via the first Bluetooth connection;
causing the multiple data receiving nodes to take over, in turn, the first Bluetooth connection in accordance with a preset switching time based on a Bluetooth clock of the data source; and
causing a second node to be selected according to a preset rule to feed back a response signal to the data source, wherein causing the second node to be selected according to the preset rule comprises:
causing the data receiving node with the highest signal energy in the Bluetooth connection with the data source to be selected as the second node.

2. The method according to claim 1, further comprising:
before or after causing the first node of the multiple data receiving nodes to establish the first Bluetooth connection with the data source,
- causing a wireless connection to be established between every two of the multiple data receiving nodes to form a relational network, the topological structure of which includes star structure, line structure, or mesh structure.

3. The method according to claim 2, further comprising:
after causing the first node of the multiple data receiving nodes to establish the first Bluetooth connection with the data source,
- causing the first node to send parameters of the first Bluetooth connection to the relational network, the parameters including at least one of:
- an address of the data source, a Bluetooth clock of the data source, an available-channel list, or a communication key.

4. The method according to claim 3, further comprising:
after causing the first node to send parameters of the first Bluetooth connection to the relational network of nodes,
- causing the multiple data receiving nodes other than the first node to track information sent by the first Bluetooth connection based on the parameters, the information including at least one of:
- audio encoding information, audio control information, video encoding information, or information of a change in channel list.

5. A method for Bluetooth connection, comprising:
- causing a first node of multiple data receiving nodes to establish a first Bluetooth connection with a data source;
- causing the multiple data receiving nodes to share a data packet transmitted by the data source via the first Bluetooth connection;
- causing the multiple data receiving nodes to take over, in turn, the first Bluetooth connection in accordance with a preset switching time based on a Bluetooth clock of the data source;
- causing the multiple data receiving nodes to send arbitration basis information to a relational network, the arbitration basis information including at least one of battery levels of the data receiving nodes themselves, serial numbers of the data receiving nodes, whether or not the data packet is received correctly, or received signal energy of the data packet, wherein each of the data receiving nodes is caused to save the arbitration basis information of all the data receiving nodes; and
- causing a second node to be selected according to a preset rule to feed back a response signal to the data source.

6. A method for Bluetooth connection, comprising:
- causing a first node of multiple data receiving nodes to establish a first Bluetooth connection with a data source;
- causing the multiple data receiving nodes to share a data packet transmitted by the data source via the first Bluetooth connection;
- causing the multiple data receiving nodes to take over, in turn, the first Bluetooth connection in accordance with a preset switching time based on a Bluetooth clock of the data source; and
- causing a second node to be selected according to a preset rule to feed back a response signal to the data source, wherein causing the second node to be selected according to the preset rule comprises:
- causing the second node to be selected from the multiple data receiving nodes according to a Bluetooth clock time at the beginning of the current data packet.

7. A method for Bluetooth connection, comprising:
- causing a first node of multiple data receiving nodes to establish a first Bluetooth connection with a data source;
- causing the multiple data receiving nodes to share a data packet transmitted by the data source via the first Bluetooth connection;
- causing the multiple data receiving nodes to take over, in turn, the first Bluetooth connection in accordance with a preset switching time based on a Bluetooth clock of the data source; and
- causing a second node to be selected according to a preset rule to feed back a response signal to the data source, wherein causing the second node to be selected according to the preset rule comprises:
- causing the second node to be selected according to whether or not the data packet is correctly received by each of the data receiving nodes.

* * * * *